(12) United States Patent
Shinmura et al.

(10) Patent No.: US 8,667,900 B2
(45) Date of Patent: Mar. 11, 2014

(54) VEHICLE BODY TILTING DEVICE AND VEHICLE BODY TILTING METHOD FOR RAIL VEHICLE

(75) Inventors: Hiroshi Shinmura, Toyokawa (JP); Tetsuya Hayashi, Kasugai (JP); Takeyoshi Mihara, Toyohashi (JP); Naohide Kamikawa, Toyokawa (JP)

(73) Assignee: Nippon Sharyo, Ltd., Aichi (JP)

( * ) Notice: Subject to any disclaimer, the term of this patent is extended or adjusted under 35 U.S.C. 154(b) by 0 days.

(21) Appl. No.: 13/824,151

(22) PCT Filed: Oct. 15, 2010

(86) PCT No.: PCT/JP2010/068170

§ 371 (c)(1),
(2), (4) Date: Mar. 15, 2013

(87) PCT Pub. No.: WO2012/049769
PCT Pub. Date: Apr. 19, 2012

(65) Prior Publication Data
US 2013/0180427 A1    Jul. 18, 2013

(51) Int. Cl.
*B61F 3/00*    (2006.01)

(52) U.S. Cl.
USPC ..................... 105/199.1; 105/199.2

(58) Field of Classification Search
USPC ................ 105/199.1, 199.2, 199.3, 199.4
See application file for complete search history.

(56) References Cited

U.S. PATENT DOCUMENTS

| | | | | |
|---|---|---|---|---|
| 3,439,631 A * | 4/1969 | Cope | ........................... | 105/198.3 |
| 3,731,638 A * | 5/1973 | Tack | ........................... | 105/199.2 |
| 3,868,911 A * | 3/1975 | Schultz | ........................... | 105/164 |
| 4,408,541 A * | 10/1983 | Takai | ........................... | 105/199.3 |
| 4,516,507 A * | 5/1985 | Dean, II | ........................ | 105/199.2 |
| 4,695,074 A * | 9/1987 | Kobayashi et al. | ........ | 280/6.157 |
| 5,222,440 A * | 6/1993 | Schneider | .................. | 105/199.1 |
| 5,454,329 A * | 10/1995 | Liprandi et al. | ........... | 105/199.2 |

(Continued)

FOREIGN PATENT DOCUMENTS

| | | |
|---|---|---|
| JP | 61-95609 U | 6/1986 |
| JP | 63-188512 A | 8/1988 |

(Continued)

OTHER PUBLICATIONS

International Search Report for PCT/JP2010/068170 dated Jan. 18, 2011.

(Continued)

*Primary Examiner* — Jason C Smith
(74) *Attorney, Agent, or Firm* — Sughrue Mion, PLLC

(57) ABSTRACT

A vehicle body tilting device for railway vehicle is arranged to control the tilt of a vehicle body by exchanging compressed air between a pair of left and right air springs. This device includes: a control valve for tilt operation, connected between the air springs; a pump for tilt operation, connected between the air springs through the control valve; and a control device for controlling both the control valve and the pump. The control valve forms a circulation flow path for allowing compressed air, delivered by the pump, to circulate therethrough. Before controlling the tilt of the vehicle body, the control device drives in advance the pump to circulate the compressed air through the circulation flow path to provide a delivery standby state, changes over at predetermined timing the position of the control valve, and delivers the compressed air from one of the air springs to the other.

9 Claims, 9 Drawing Sheets

(56) References Cited

U.S. PATENT DOCUMENTS

| | | | |
|---|---|---|---|
| 5,558,024 A * | 9/1996 | Solera et al. | 105/199.2 |
| 5,564,342 A * | 10/1996 | Casetta et al. | 105/199.2 |
| 5,921,185 A * | 7/1999 | Hoyon et al. | 105/4.1 |
| 6,131,520 A * | 10/2000 | Dull | 105/199.2 |
| 6,244,190 B1 * | 6/2001 | Sembtner et al. | 105/199.2 |
| 6,247,413 B1 * | 6/2001 | Teichmann | 105/199.1 |
| 6,273,001 B1 * | 8/2001 | Amigot et al. | 105/199.1 |
| 6,273,002 B1 * | 8/2001 | Hachmann et al. | 105/199.1 |
| 6,279,488 B1 * | 8/2001 | Hachmann et al. | 105/453 |
| 6,786,159 B2 * | 9/2004 | De Fleury et al. | 105/199.2 |
| 6,978,719 B2 * | 12/2005 | Sebata et al. | 105/199.1 |
| 7,721,656 B2 * | 5/2010 | Indio da Costa | 104/124 |
| 8,079,310 B2 * | 12/2011 | Popjoy et al. | 105/453 |
| 8,122,835 B2 * | 2/2012 | Korner | 105/133 |
| 8,171,861 B2 * | 5/2012 | Rodet | 105/182.1 |
| 8,356,557 B2 * | 1/2013 | Schneider | 105/199.2 |
| 2002/0035947 A1 * | 3/2002 | Sebata et al. | 105/199.2 |
| 2003/0047898 A1 | 3/2003 | Nagy et al. | |
| 2010/0083866 A1 * | 4/2010 | Rodet et al. | 105/34.1 |
| 2010/0199878 A1 * | 8/2010 | Flicker et al. | 105/199.1 |
| 2010/0307371 A1 * | 12/2010 | Rodet | 105/133 |
| 2012/0137926 A1 * | 6/2012 | Schneider | 105/413 |
| 2012/0227617 A1 * | 9/2012 | Schneider | 105/199.2 |
| 2012/0318164 A1 * | 12/2012 | Shinmura et al. | 105/138 |
| 2013/0032054 A1 * | 2/2013 | Schneider et al. | 105/199.1 |
| 2013/0145955 A1 * | 6/2013 | Gotou | 105/199.1 |
| 2013/0180427 A1 * | 7/2013 | Shinmura et al. | 105/199.1 |

FOREIGN PATENT DOCUMENTS

| | | |
|---|---|---|
| JP | 64-047672 A | 2/1989 |
| JP | 2635603 B2 | 7/1997 |
| JP | 2650562 B2 | 9/1997 |
| JP | 3262156 B2 | 3/2002 |
| JP | 2002-254912 A | 9/2002 |
| JP | 2003-231465 A | 8/2003 |
| JP | 2003-525159 A | 8/2003 |
| JP | 2004-082964 A | 3/2004 |
| JP | 2004-123053 A | 4/2004 |
| JP | 2004-209995 A | 7/2004 |
| JP | 2006-044419 A | 2/2006 |
| JP | 3814237 B2 | 8/2006 |
| JP | 4077293 B2 | 4/2008 |
| JP | 2009-046027 A | 3/2009 |
| JP | 4242719 B2 | 3/2009 |
| JP | 4294931 B2 | 7/2009 |

OTHER PUBLICATIONS

Taiwanese Office Action issued Aug. 28, 2013 for counterpart Taiwanese Patent Application No. 100135460.

* cited by examiner ial Appli-
VEHICLE BODY TILTING DEVICE AND VEHICLE BODY TILTING METHOD FOR RAIL VEHICLE

CROSS REFERENCE TO RELATED APPLICATIONS

This application is a National Stage of International Application No. PCT/JP2010/068170 filed Oct. 15, 2010, the entire contents of which are incorporated herein by reference.

TECHNICAL FIELD

The present invention relates to a vehicle body tilting device and a vehicle body tilting method for rail vehicle, arranged to transfer compressed air between a pair of left and right air springs to control tilting of a vehicle body.

BACKGROUND ART

A rail or railway vehicle runs with its vehicle body mounted on a bogie or carriage. At the time of running, air springs are placed between the vehicle body and the bogie to absorb vibration and an amount of air in each air spring is regulated to adjust the height and the tilting of the vehicle body. Patent Document 1 listed below discloses a device arranged to switch over a control valve to supply and discharge compressed air with respect to a pair of left and right air springs, so that the compressed air is discharged from one of the air springs while the compressed air is supplied to the other air spring. By this forcibly changing the height of the left and right air springs, the vehicle body is tilted, compensating cant deficiency during running on a curved track to improve ride comfort.

Patent Document 2 listed below discloses a vehicle body tilting device for rail vehicle arranged to compensate cant deficiency. In particular, this device is configured to transfer compressed air back and forth between left and right air springs. FIG. 9 is a conceptual diagram showing a rail vehicle provided with such a conventional vehicle body tilting device, illustrating a state of the vehicle during running on a curved track. FIG. 10 is a conceptual diagram showing a vehicle body tilting controller. An air pump 105 is placed between left and right air springs 101 and 102 which are individually connected to pipes 106. The air pump 105 used herein is a roots pump designed to provide a flow velocity and a flow rate which are substantially uniquely determined based on a rotation speed and the number of rotations and to rotate reversibly at variable speeds.

When the rail vehicle runs on a curved section where cant deficiency may occur, a reversible variable-speed motor 111 is controlled by a control unit 112 to drive the air pump 105 shown in FIG. 10. Accordingly, the air pump 105 serves to transfer compressed air from the air spring 101 located on the inside of a curve to the air spring 102 located on the outside of the curve. As shown in FIG. 9, the air spring 101 on the inside of the curve contracts, while the air spring 102 on the outside of the curve expands, thereby preventing tilting of a vehicle body 110 caused by a centrifugal force during curve-track running.

RELATED ART DOCUMENTS

Patent Documents

Patent Document 1: Japanese Patent No. 3814237
Patent Document 2: Japanese Patent No. 2635603

SUMMARY OF INVENTION

Problems to be Solved by the Invention

Meanwhile, in the vehicle body tilting device disclosed in the above Patent Document 1, when the heights of the air springs are to be adjusted, the compressed air to expand and extend the air springs is stored in a main tank by a compressor mounted in the vehicle body and is supplied therefrom. On the other hand, when the air springs are to be contracted, the compressed air supplied thereto is released to atmosphere. In a railway section having successive curves in a mountain area for example, the heights of the air springs are adjusted a large number of times, resulting in increased consumption of compressed air. The conventional vehicle body tilting device employs a high-capacity compressor and a high-capacity air tank so as not to decrease the pressure of the compressed air or adopts a structure including a plurality of small-capacity compressors and a plurality of small-capacity air tanks. This configuration causes difficulty in mounting the compressor(s) and the air tank(s) in a narrow space beneath the vehicle body and also leads to increased initial costs and maintenance costs.

To solve the above disadvantages, it is conceivable to lower the consumption of compressed air. Therefore, the device configured to transfer compressed air between the left and right air springs 101 and 102 as disclosed in Patent Document 2 mentioned above can reduce the needless consumption of compressed air to be released to atmosphere. However, in the vehicle body tilting device in Patent Document 2 in which the pump does not idle with no load, the pump is subjected to excess load and could not actually driven. Unless a vehicle body is strictly tilted according to a running position, ride comfort rather deteriorates. In the structure that tilting motion of the vehicle body is directly linked to driving of the pump, the pump is very difficult to control even when it is driven. Such structure is hard to achieve.

The present invention has been made to solve the above problems and has a purpose to provide a vehicle body tilting device and a vehicle body tilting method for rail vehicle, configured to transfer compressed air between a pair of left and right air springs without forcibly operating a pump to control tilting of a vehicle body.

Means of Solving the Problems

To achieve the above purpose, one aspect of the invention provides a vehicle body tilting device for rail vehicle, the device being configured to transfer compressed air between a pair of left and right air springs placed between a vehicle body and a bogie to expand and contract the left and right air springs to control tilting of the vehicle body, the device including: one or two control valves for tilt operation connected between the left and right air springs; a pump for tilt operation connected between the left and right air springs through the control valve or valves; and a control unit for controlling the control valve or valves and the pump, wherein the pump having an input port and an output port that are connected to an circulation flow path to allow compressed air to circulate therethrough from the outlet port to the inlet port, the one or two control valves is connected to a point in the circulation flow path, and wherein the control unit is configured to drive the pump in advance before controlling tilting of the vehicle body to circulate the compressed air through the circulation flow path to provide a delivery stand-by state, switch the control valve or valves at predetermined timing to transfer the compressed air from one to the other of the left and right air springs.

In the above vehicle body tilting device for rail vehicle, preferably, the control unit drives the pump continuously or intermittently to provide the delivery stand-by state.

In the above vehicle body tilting device for rail vehicle, preferably, the control valve is a single four-port electromagnetic valve configured to form a connecting pattern to transfer the compressed air from the left air spring to the right air spring, a connecting pattern to transfer compressed air from the right air spring to the left air spring, and a connecting pattern to shut off between the right and left air springs and constitute the circulation flow path.

In the above vehicle body tilting device for rail vehicle, preferably, the control valves are two three-port electromagnetic valves configured to form a connecting pattern to transfer the compressed air from the left air spring to the right air spring, a connecting pattern to transfer compressed air from the right air spring to the left air spring, and a connecting pattern to shut off between the right and left air springs and constitute the circulation flow path.

Another aspect of the invention provides a vehicle body tilting method for rail vehicle, including adjusting tilting of a vehicle body by supplying and discharging compressed air to expand and contract a pair of left and right air springs placed between the vehicle body and a bogie, the method using: one or two control valves for tilt operation connected between the left and right air springs; a pump for tilt operation connected between the left and right air springs through the control valve or valves; a vehicle body tilting mechanism including a low-pressure-side tank connected to an upstream pipe located between the control valve or valves and the pump and a high-pressure-side tank connected to a downstream pipe located between the control valve or valves and the pump; and a height adjusting mechanism including height control valves provided one in each of the pair of left and right air springs, a link mechanism arranged to convert up-and-down displacement of a height adjusting rod connected to the bogie to rotation of a valve shaft of each height control valve, and actuators placed in the link mechanism and configured to rotate the valve shafts, wherein the method includes: driving the pump of the vehicle body tinting mechanism in advance before adjusting tilting of the vehicle body to generate a pressure difference between the low-pressure-side tank and the high-pressure-side tank to provide a delivery stand-by state, and switching the control valve or valves or valves at predetermined timing to deliver compressed air from the high-pressure-side tank to one of the left and right air springs while drawing compressed air from the other air spring to the low-pressure-side tank, and driving the actuator of the height adjusting mechanism at predetermined timing in association with tilting of the vehicle body to supply and discharge compressed air with respect to the left and right air springs via the height control valve or valves to make fine adjustment of the tilting.

In the above vehicle body tilting method for rail vehicle, preferably, the pump is driven based on a detection value of a pressure sensor provided in the high-pressure-side tank.

The above vehicle body tilting device for rail vehicle, preferably, further comprises: a height adjusting mechanism including: height control valves provided one in each of the pair of left and right air springs; a link mechanism arranged to convert up-and-down displacement of a height adjusting rod connected to the bogie to rotation of a valve shaft of each height control valve; and actuators placed in the link mechanism and configured to rotate the valve shafts, wherein the control unit is configured to transfer compressed air from one to the other of the left and right air springs and drive the actuators at predetermined timing to supply and discharge compressed air with respect to the air springs through the height control valves.

In the above vehicle body tilting device for rail vehicle, preferably, the actuators are air cylinders formed to be integral and coaxial with the height adjusting rods.

In the above vehicle body tilting device for rail vehicle, preferably, the actuators are rotary solenoids arranged to rotate the valve shafts.

Effects of the Invention

According to the invention, the pump for tilt operation is driven in advance before controlling the tilting of the vehicle body, thus allowing the compressed air to circulate through the circulation flow path to establish the delivery stand-by state. Alternatively, the pump for tilt operation is driven to generate a pressure difference between the low-pressure-side tank and the high-pressure-side tank to establish the delivery stand-by state. Accordingly, it is possible to transfer compressed air back and forth between the pair of left and right air springs by use of the pump to tilt the vehicle body. Thus, the consumption of compressed air conventionally released to atmosphere can be reduced. There is no need to increase the sizes of a compressor and a main tank or provide two or more compressors and main tanks. This results in reduction in initial costs and maintenance costs. It is further possible to reduce the amount of compressed air to be generated by the compressor and hence improve energy efficiency.

BRIEF DESCRIPTION OF THE DRAWINGS

Figure 1:
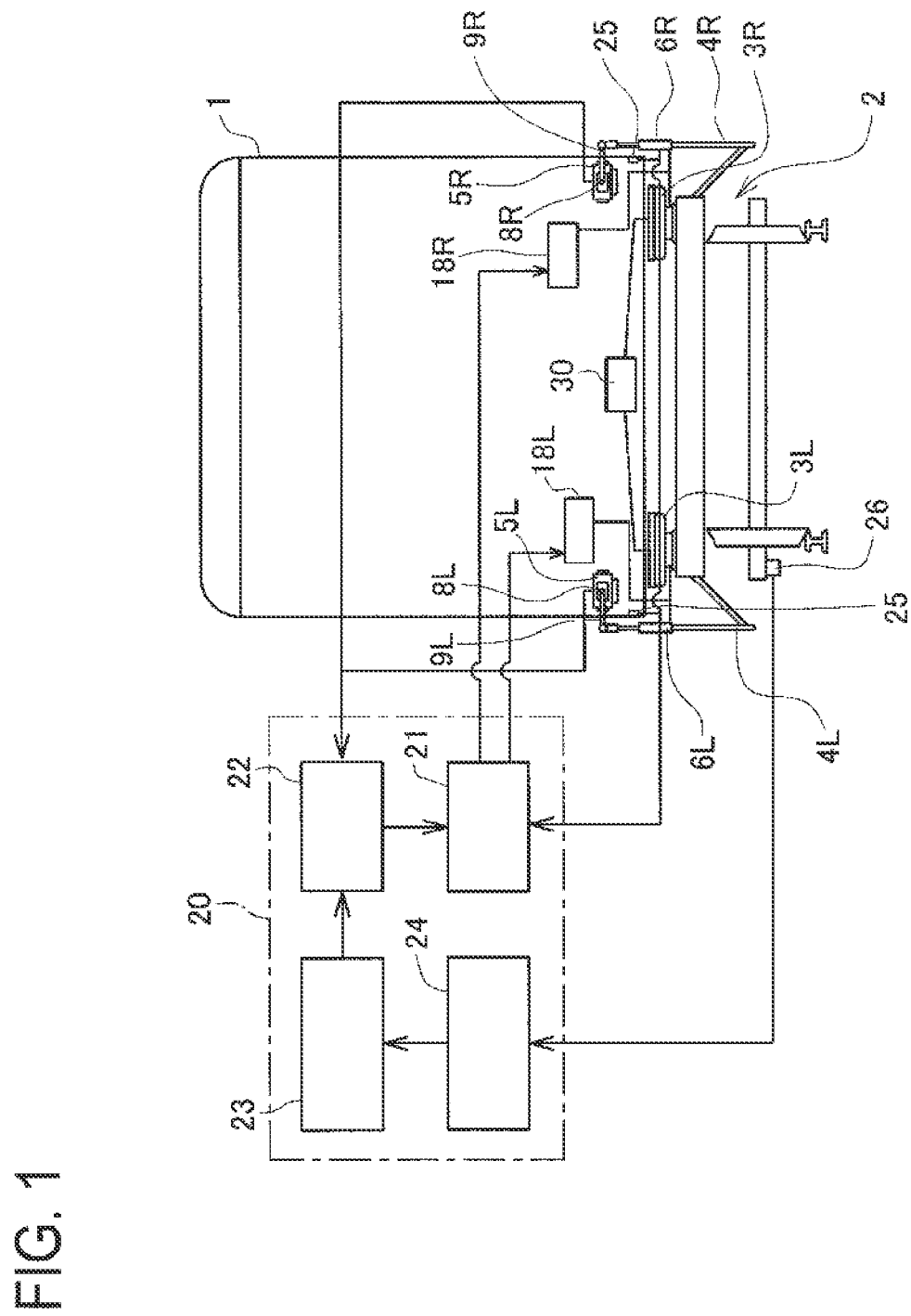
FIG. 1 is a schematic view showing a vehicle body tilting device in an embodiment.

1 Vehicle body
2 Bogie
3L, 3R Air spring
4L, 4R Height adjusting rod
5L, 5R Height control valve
6L, 6R Height adjusting cylinder 8L, 8R Valve shaft
9L, 9R Lever
12 Air tank
18L, 18R Stroke adjusting valve
20 Control unit
30 Pump tilting mechanism
32L, 32R Pipe
33 Control valve for tilt operation
34 Pump for tilt operation
35 Upstream pipe
36 Downstream pipe

MODE FOR CARRYING OUT THE INVENTION

A detailed description of a preferred embodiment of a vehicle body tilting device and a vehicle body tilting method for rail vehicle embodying the present invention will now be given referring to the accompanying drawings. FIG. 1 is a schematic view showing a vehicle body tilting device in the embodiment. A rail vehicle includes a vehicle body 1 mounted on a bogie 2 through left and right air springs 3L and 3R. The vehicle body tilting device in the present embodiment is designed so that the left and right air springs 3L and 3R are symmetric. In the following explanations and drawings, therefore, components indicated by reference signs with a suffix "L" represent components located on a left side of the vehicle and components indicated by reference signs with a suffix "R" represent components located on a right side.

The air springs 3L and 3R are each provided with a height adjusting mechanism including height adjusting rods 4L and 4R, height control valves 5L and 5R, and others. This configuration is to tilt the vehicle body to compensate cant deficiency and also keep the vehicle height constant with respect to load variation. For this purpose, compressed air is supplied/discharged to/from the air springs 3L and 3R to adjust the heights of the air springs 3L and 3R. The height adjusting rods 4L and 4R are provided, at respective upper portions, with height adjusting cylinders 6L and 6R which are coaxial with the rods 4L and 4R respectively and serve as an actuator. The cylinders 6L and 6R extend upon receipt of compressed air and contract by spring force. The cylinders 6L and 6R are connected, at their ends, with levers 9L and 9R respectively.

Figure 2:
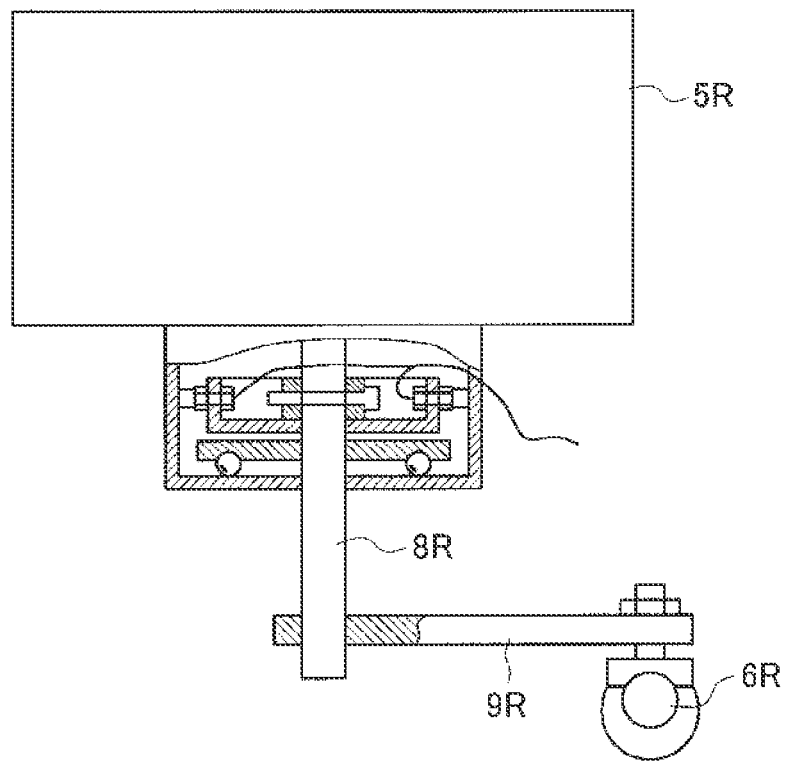
FIG. 2 is a plan view illustrating a configuration that connects a height adjusting cylinder to a height control valve.

FIG. 2 is a plan view illustrating a configuration that connects the cylinder 6R to the height control valve 5R. Although this drawing shows only a right side in FIG. 1, a left side is similarly configured. The valve 5R is a three-port switching valve, from which a valve shaft 8R for operating switchover between ports of the valve 5R extends out and is connected with the lever 9R which extends in a direction perpendicular to the shaft 8R. Accordingly, the height adjusting rod 4R integrally provided with the cylinder 6R, the lever 9R, and the valve shaft 8 constitute a link mechanism. The lever 9R is swung by up-and-down displacement of the rod 4R and extension and contraction of the cylinder 6R, thereby rotating the shaft 8R to switch over the ports of the valve 5R.

The height control valves 5L and 5R are placed on the vehicle body 1 side. Thus, when the air springs 3L and 3R expand and contract from a state shown in FIG. 1, the distance between the vehicle body 1 and the bogie 2 is changed, accordingly displacing the height adjusting rods 4L and 4R up or down, thus swinging the levers 9L and 9R. According to the swinging direction of the levers 9L and 9R, the rotation direction of the valve shafts 8L and 8R, that is, switchover of the ports of the valves 5L and 5R is determined. By switching over the ports, compressed air is supplied from a main tank 12 which is an air reservoir into the air spring 3L or 3R and released from the air spring 3L or 3R to atmosphere.

Figure 3:
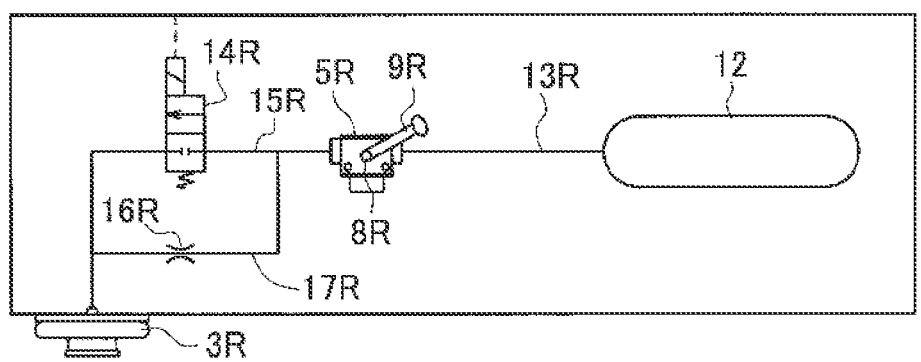
FIG. 3 is a conceptual diagram showing pipe arrangement between a main tank and an air spring, through which compressed air flows via the height control valve.

FIG. 3 is a conceptual diagram showing pipe arrangement between the main tank 12 and the air spring 3R, through which compressed air flows via the height control valve 5R. This figure illustrates only the right side in FIG. 1, but the left side is similarly configured. The air spring 3R is connected to the main tank 12 through a pipe 13R and connected to the control valve 5R through a pipe 15R on which a normally-closed open/close valve 14R is provided and a pipe 17R on which a diaphragm 16 is provided, the pipes 15 and 17 being connected in parallel. In case power is stopped, accordingly, the compressed air is allowed to flow through the diaphragm 16R to enable supply/discharge of the compressed air at a small flow rate with respect to the air spring 3R.

Figure 4:
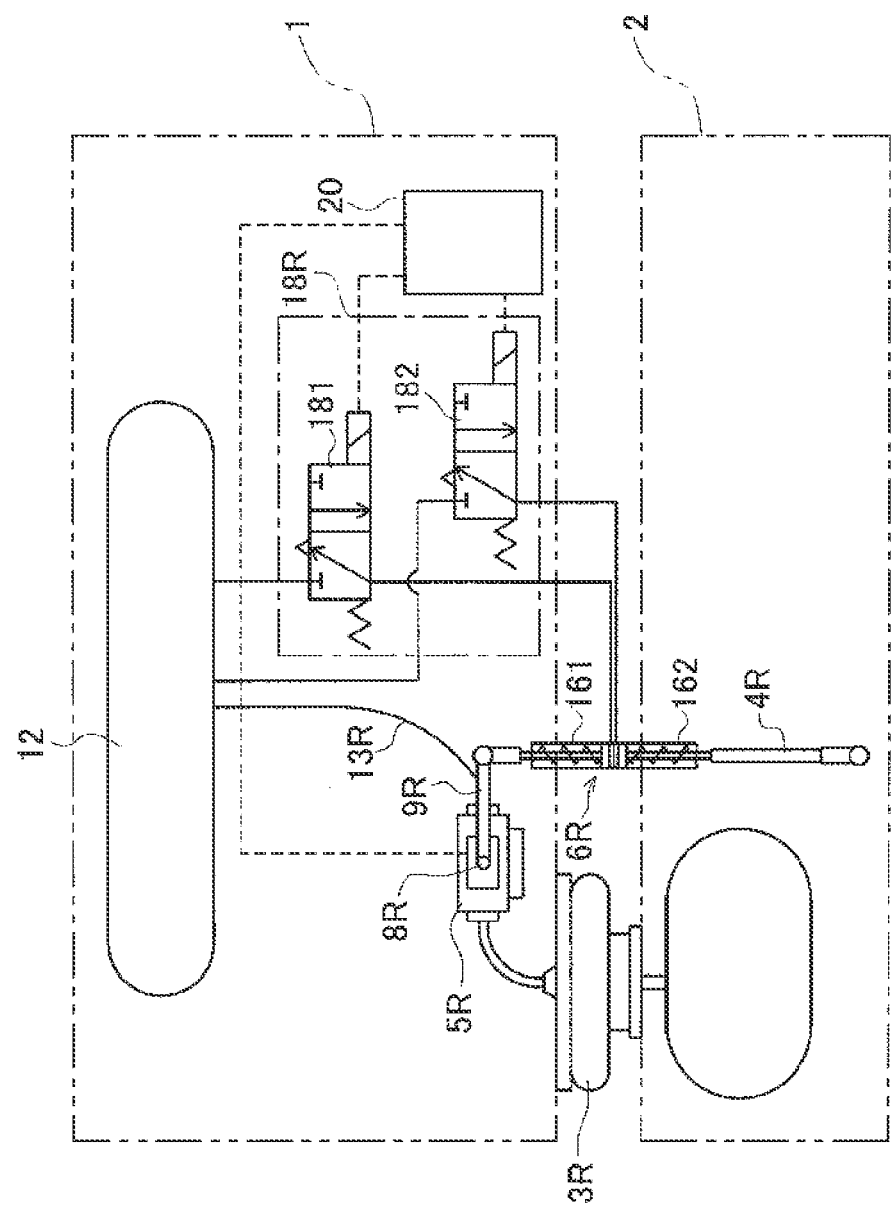
FIG. 4 is a conceptual diagram showing an air spring and a height adjusting mechanism.

FIG. 4 is a schematic diagram showing the air spring and the height adjusting mechanism. This figure also shows only the right side in FIG. 1, but the left side is similarly configured. In FIG. 4, some components such as the open/close valve 14R and the diaphragm 16R are not illustrated. The height adjusting cylinder 6R has a cylinder chamber communicating with the main tank 12 through a stroke adjusting valve 18R consisting of a pair of electromagnetic valves 181 and 182. The stroke adjusting valve 18R is controlled to extend and contract the cylinder 6R. Specifically, the cylinder 6R includes a pair of upper and lower air cylinders 161 and 162, which are extended and retracted by opening and closing of the electromagnetic valves 181 and 182 respectively, thereby adjusting the stroke of the cylinder 6R.

The control unit 20 is arranged to control raising/lowering of the vehicle body 1 and tilting of the vehicle body 1. The control unit 20 includes, as shown in FIG. 1, a vehicle height control section 21, an abnormality diagnosing section 22, a track data storing section 23, and a location information detecting section 24. To the vehicle height control section 21, there is connected a sensor 25 for detecting the height of a platform. This sensor 25 is provided in the vehicle body 1. To the location information detecting section 24, there is connected a vehicle-speed and depot-signal sensor 26 for detecting a vehicle speed signal and receiving a location information signal from a ground coil such as a data depot placed before a curved section of a traveling track.

Figure 5:
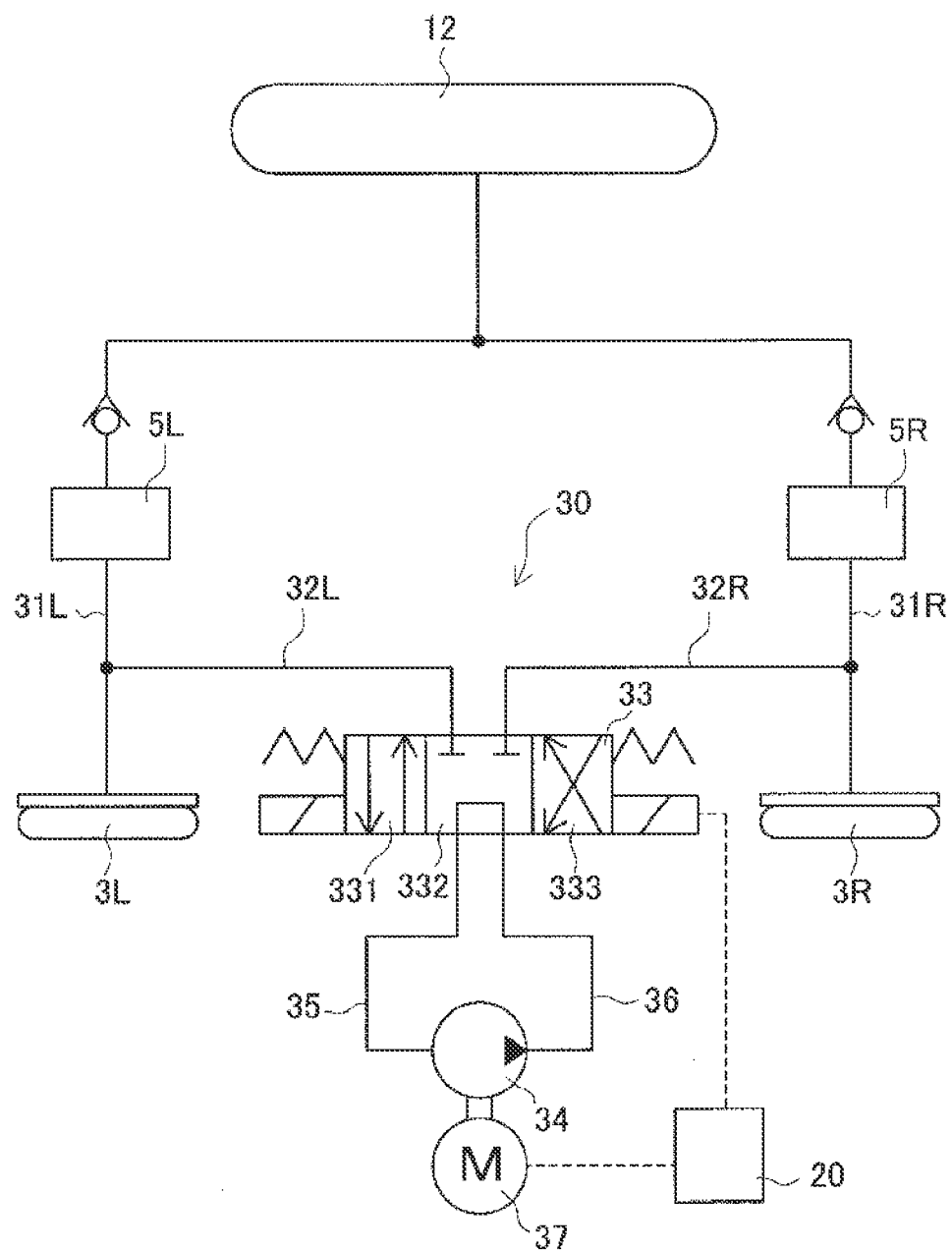
FIG. 5 is a conceptual diagram showing a pump tilting mechanism constituting a vehicle body tilting device in a first embodiment.

FIG. 5 is a conceptual diagram showing a pump-operated tilting mechanism ("pump tilting mechanism") for the left and right air springs 3L and 3R. This pump tilting mechanism 30 is configured to transfer compressed air discharged from an air spring on a contraction side to an air spring on an extension side to be expanded when the vehicle body 1 is to be tilted. The air springs 3L and 3R are connected to the main tank 12 via the height control valves 5L and 5R respectively. Further, pipes 32L and 32R branch from pipes 31L and 31R respectively connecting the open/close valves 14L and 14R and the diaphragms 16L and 16R (see FIG. 3), not illustrated in FIG. 5, to the air springs 3L and 3R.

The left and right air springs 3L and 3R are connected to each other via a control valve 33 for tilt operation and a pump 34 for tilt operation (a booster pump). The control valve 33 is a four-port electromagnetic valve, which is connected to the pipes 32L and 32R leading to the air spring 3L and 3R and connected to an upstream pipe 35 and a downstream pipe 36 leading to the pump 34. The control valve 33 includes a left block 331 and a right block 333 which are connectable to the left and right air springs 3L and 3R in a manner to alternately change an input port and an output port of the pump 34, and further a central block 332 to shut off communication between the air springs 3L and 3R to switching connecting patterns of flow passages. The central block 332 is configured to shut off the communication between the pipes 32L and 32R and also provide communication between the upstream pipe 35 and the downstream pipe 36 on the pump 34 side.

During straight running in which the vehicle body 1 is not tilted, the control valve 33 is arranged in a connecting pattern using the central block 332 shown in the figure, in which communication between the left and right air springs 3L and 3R is shut off, while the upstream pipe 35 and the downstream pipe 36 are connected to form a circulation or annular flow path through the pump 34. Specifically, this pattern makes the pump 34 idle under a small load because the pump 34 cannot respond to quick driving with large load. Thus, the compressed air circulates through the circulation flow path, driving the pump 34 in advance and then providing a delivery stand-by state for transferring compressed air between the air springs 3L and 3R. Since the temperature in the circulation flow path rises, however, it is necessary to for example design the upstream pipe 35 and the downstream pipe 36 as a long pipe having a certain length or intermittently drive the pump 34 to idle, without continuously driving the pump 34. The control valve 33 for tilt operation and the pump motor 37 of the pump 34 for tilt operation are connected to the control unit 20 and thus controlled to tilt the vehicle body based on a command signal from the vehicle height control section 21 (see FIG. 1).

The following explanation is given to tilting control of the vehicle body 1. When passengers board or exit, firstly, the vehicle body 1 moves up and down in association with load variations thereon and the distance from the bogie 2 is changed. In the height adjusting mechanism shown in FIG. 1 and others, therefore, the height adjusting rods 4L and 4R are relatively displaced in up and down directions with respect to the vehicle body 1. Thus, the levers 9L and 9R are swung, rotating the valve shafts 8L and 8R to switching the height control valves 5L and 5R. In this state, the open/close valves 14L and 14R (see FIG. 3) are closed, the compressed air is allowed to flow through the diaphragms 16 to be supplied into or discharged from the air springs 3L and 3R. When the levers 9L and 9R return to a horizontal position, the height control valves 5L and 5R are switched over again to stop supply/discharge of the compressed air.

To be concrete, when passengers board on the vehicle 1, increasing passenger weight, the air springs 3L and 3R are compressed and the vehicle body 1 is lowered. Accordingly, the height adjusting rods 4L and 4R relatively move up, causing the height control valves 5L and 5R to switching their ports, thereby transferring the compressed air form the main tank 12 to the air springs 3L and 3R. On the other hand, when passengers exit from the vehicle 1, decreasing the passenger weight, the vehicle body 1 is raised and the rods 4L and 4R relatively move downward, causing the control valves 5L and 5R to switch over their ports, thereby releasing the compressed air from the air springs 3L and 3R to atmosphere. In any case, after the air springs 3L and 3R expand or contract by a fixed amount, the levers 9L and 9R return to the horizontal position and each port is shut off, stopping supply/discharge of the compressed air. The vehicle body 1 is thus held at a predetermined height (position).

Furthermore, the height adjusting mechanism is also configured to control supply/discharge of the compressed air with respect to the air springs 3L and 3R to control the tilting of the vehicle body during running, in addition to adjustment of the height of the vehicle body 1. In the present embodiment, specifically, the tilting control of the vehicle body 1 is performed by, in addition to supply/discharge of the compressed air performed between the left and right air springs 3L and 3R by the pump tilting mechanism 30, switchover of the height control valves 5L and 5R by extension and retraction of the height adjusting cylinders 6L and 6R.

When the vehicle body 1 is to be tilted to the left, the left air spring 3L is contracted to decrease in height, but the right air spring 3R is expanded to increase in height. When the vehicle body 1 is to be tilted to the right, the air springs 3L and 3R make reverse expansion and contraction. In the vehicle body tilting device of the present embodiment, for example, the vehicle body 1 is tilted in such a manner that compressed air is fed by the pump tilting mechanism 30 from the air spring 3L to be contracted to the air spring 3R to be expanded. Further, fine adjustment of tilting of the vehicle body 1 is performed in a way that the height adjusting cylinders 6L and 6R are extended or retracted to switch over the control valves 5L and 5R to supply or discharge compressed air with respect to the air springs 3L and 3R.

In the rail vehicle during running, the vehicle-speed and depot-signal sensor 26 receives a location information signal from a ground coil such as data depot. In the control unit 20, the vehicle speed detected by the vehicle height control section 21 and the track data stored in the track data storing section 23 are compared. Based on a curved section information such as a curvature of the curved section, cant amount, and others, the vehicle body tilting control is executed according to a vehicle body tilting control program stored in the vehicle height control section 21.

In the pump tilting mechanism 30 shown in FIG. 5, during running of the rail vehicle, the pump 34 is continuously or intermittently driven by the pump motor 37, that is, at so-called idle. At that time, by operation of the pump 34, the compressed air in the pipes is circulated so as to flow from the upstream pipe 35 to the downstream pipe 36 and return to the upstream pipe 35 via the control valve 33. In this way, the delivery stand-by state is provided to thereafter transfer the compressed air back and forth between the air springs 3L and 3R.

A command signal is transmitted from the vehicle height control section 21 to switch the control valve 33. While the pump 34 is intermittently driven, the pump 34 is activated in advance before switchover of the control valve 33. On the other hand, while the pump 34 is continuously driven, the pump 34 remains driven and the control valve 33 is switched over.

To tilt the vehicle body 1 to the left, the control valve 33 is switched to set the left block 331 in a connecting position at predetermined timing based on the information of the curved section, so that the pipe 32 is connected, or communicated, to the upstream pipe 35 and the pipe 32R is connected, or communicated, to the downstream pipe 36. Accordingly, by operation of the pump 34, the compressed air is drawn from the air spring 3L and transferred to the opposite air spring 3R. The left air spring 3L thus lowers as the compressed air is discharged therefrom, while the right air spring 3R expands as the compressed air is supplied therein, so that the vehicle body 1 is tilted to the left. Just before the vehicle body 1 is tilted to a target angle, the control valve 33 is switched to set the central block 332 in the connecting position and simultaneously the control is changed to tilting control using extension and retraction of the height adjusting cylinders 6L and 6R.

In the tilting control using the height adjusting mechanism, for the left air spring 3L, the stroke adjusting valve 18L is controlled to retract the cylinder 6L. This switches the control valve 5L to release the compressed air from the air spring 3L at a fixed amount to atmosphere. On the other hand, for the right air spring 3R, the stroke adjusting valve 18R is controlled to supply compressed air from the main tank 12 to the cylinder 6R, which is thus extended. This switches the control valve 5R to supply the compressed air from the main tank 12 to the air spring 3R. By the above operating of the cylinders 6L and 6R, fine adjustment of tilting of the vehicle body 1 is achieved.

Thereafter, the vehicle body 1 of the rail vehicle is returned to the horizontal state when the rail vehicle exits the curved section of a traveling track. In this case, the control valve 33 for tilt operation is switched to set the right block 333 in the connecting position so that the pipe 32L is connected to the downstream pipe 36 and the pipe 32R is connected to the upstream pipe 35. By operation of the pump 34, therefore, the compressed air is drawn from the air spring 3R and transferred into the opposite air spring 3L. The expanded right air spring 3R lowers as the compressed air is discharged therefrom, while the contracted left air spring 3L expands as the compressed air is supplied therein. The vehicle body 1 is accordingly returned to the horizontal state. In this state, the height adjusting cylinders 6L and 6R are controlled to extend/retract, thereby supplying or discharging the compressed air with respect to the air springs 3L and 3R through the height control valves 5L and 5R to perform fine adjustment. The above tilting and returning from a tilted state are similarly performed in the case of tilting the vehicle body 1 to the right.

In the vehicle body tilting device of the present embodiment, the pump tilting mechanism 30 operates to transfer compressed air between the left and right air springs 3L and 3R. This can reduce the consumption of compressed air conventionally released to atmosphere. Therefore, even when the tilting control of the vehicle body 1 is repeated in a rail section including successive curves, the consumption of compressed air can be greatly suppressed, which does not need to increase the sizes of a compressor not shown and the main tank 12 or to provide two or more compressors and main tanks. The vehicle body tilting device of the present embodiment thus can reduce initial costs and maintenance costs. It is further possible to reduce the amount of compressed air generated by the compressor and hence improve an energy efficiency.

In the present embodiment, the above advantages are achieved by idling the pump 34 for tilt operation. This pump tilting mechanism 30 can be provided with a simple configuration and at low cost. The pump 34 for tilt operation has only to be configured to generate an internal pressure difference (on the order of 0 to 0.1 MPa) between the left and right air springs 3L and 3R. Thus, the pump 34 can be driven at less power. The pump 34 may be driven intermittently as needed, instead of driven continuously, so that further reduction of power consumption is achieved. Since the compressed air is actively delivered by the pump 34, the left and right air springs 3L and 3R can be expanded or contracted at high speed to increase the tilting speed and the returning speed.

Second Embodiment

Figure 6:
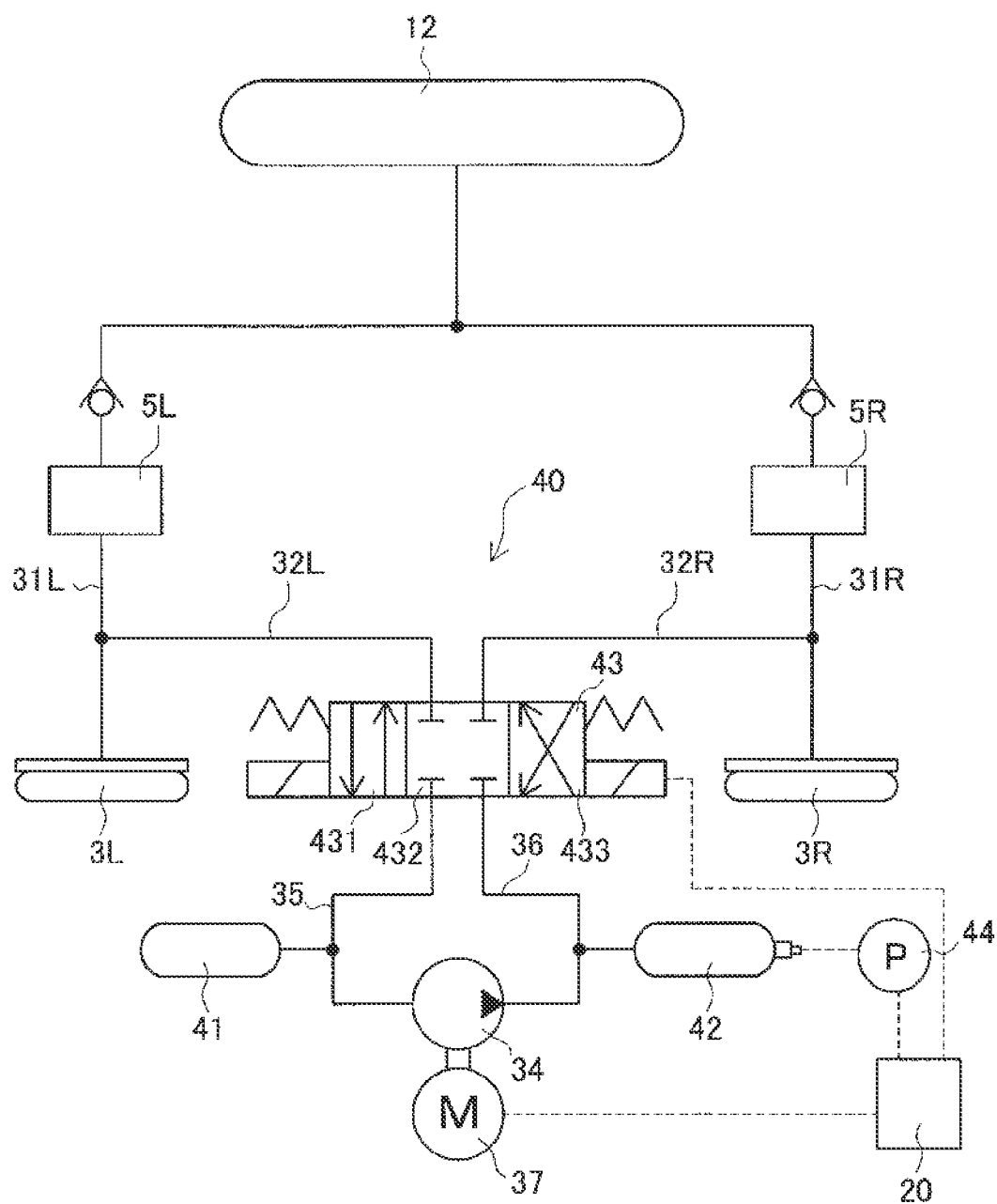
FIG. 6 is a conceptual diagram showing a pump tilting mechanism constituting a vehicle body tilting device in a second embodiment.

A second embodiment of a vehicle body tilting device for rail vehicle according to the present invention will be described below. The second embodiment differs from the first embodiment in the pump tilting mechanism 30 shown in FIG. 5. FIG. 6 is a conceptual diagram showing a pump tilting mechanism of the present embodiment. Identical or similar parts to those in the first embodiment are given the same reference signs as those in the first embodiment. This pump tilting mechanism 40 is configured such that the upstream pipe 35 and the downstream pipe 36 are connected to the pump 34 for tilt operation, the upstream pipe 35 is also connected to a low-pressure-side tank 41 and the downstream pipe 36 is also connected to a high-pressure-side tank 42. In the present embodiment, the pump 34 is driven to generate a pressure difference between the lower-pressure-side tank 41 and the high-pressure-side tank 42, thereby providing a stand-by state for transferring compressed air between the air springs 3L and 3R. The main tank 12 which is an air reservoir has a capacity of 100 litters, whereas each of the low-pressure-side tank 41 and the high-pressure-side tank 42 has a capacity of 15 litters, which is a small tank.

A control valve 43 for tilt operation, which is a four-port electromagnetic valve, includes a central block 432 for shutting off all the pipes connected thereto, a left block 431 and a right block 433 connectable to the left and right air springs 3L and 3R by alternately selecting an input port (the low-pressure-side tank 41) and an output port (the high-pressure-side tank 42) of the pump 34. A pressure sensor 44 is provided in the high-pressure-side tank 42. The control unit 20 is connected to the pressure sensor 44, the pump motor 37, and the control valve 43. The low-pressure-side tank 41 is provided with a low-pressure limit switch and a negative pressure relief which are not illustrated to more stabilize operations in a delivery stand-by state which will be mentioned later.

In the pump tilting mechanism 40 of the present embodiment, before tilting control of the vehicle body 1 is started, the pump 34 is driven in advance to decrease the internal pressure of the low-pressure-side tank 41 to a set value and increase the internal pressure of the high-pressure-side tank 42 to a set value. To be specific, by operation of the pump 34, the compressed air is transferred from the upstream pipe 35 to the downstream pipe 36, thereby increasing the internal pressure of the high-pressure-side tank 42 to about 0.9 MPa equal to that of the main tank 12, while decreasing the internal pressure of the low-pressure-side tank 41 to about an atmospheric pressure. The internal pressure of the high-pressure-side tank 42 is detected by the pressure sensor 44 and, based on a detection signal thereof, driving of the pump motor 37 is controlled. In this manner, a delivery stand-by state to transfer compressed air between the air springs 3L and 3R is provided.

For instance, when the vehicle body 1 is to be tilted to the left, the control valve 43 for tilt operation is switched at a predetermined timing to set the left block 431 in a connecting position. Accordingly, the pipe 32L is connected to the upstream pipe 35 and the pipe 32R is connected to the downstream pipe 36. Since the internal pressures of the air springs 3L and 3R are each about 0.3 to 0.5 MPa, the compressed air in the air spring 3L is drawn out into the low-pressure-side tank 41 whose pressure is atmospheric pressure, while the compressed air flows in the air spring 3R from the high-pressure-side tank 42 whose pressure is higher than the internal pressure of the air spring 3R. The left air spring 3L lowers as the compressed air is discharged therefrom and the right air spring 3R expands as the compressed air is supplied therein, causing the vehicle body 1 to tilt to the left.

Just before the vehicle body 1 is tilted to a target angle, the control valve 43 for tilt operation is switched to set the central block 432 in the connecting position. As in the first embodiment, furthermore, the tilting control of the vehicle body 1 is performed by extension and retraction of the height adjusting cylinders 6L and 6R shown in FIG. 1. Specifically, by extension and retraction of the cylinders 6L and 6R, the ports of the height control valves 5L and 5R are changed over to supply/discharge compressed air with respect to the air springs 3L and 3R, thereby performing fine adjustment of tilting of the vehicle body 1.

Thereafter, the vehicle body 1 is returned to the horizontal state when the rail vehicle exits the curved section of a traveling track. In this case, the control valve 43 for tilt operation is switched to set the right block 433 in the connecting position, providing communication between the air spring 3L and the high-pressure-side tank 42 and between the air spring 3R and the low-pressure-side tank 41. Accordingly, the compressed air is discharged from the air spring 3R and transferred into the opposite air spring 3L. Thus, the expanded right air spring 3R lowers as the compressed air is discharged therefrom, while the contracted left air spring 3L expands as the compressed air is supplied therein. Accordingly, the vehicle body 1 is returned to the horizontal state. In this state, the height adjusting cylinders 6L and 6R are controlled to extend/contract, thereby supplying or discharging the compressed air with respect to the air springs 3L and 3R through the height control valves 5L and 5R to make fine adjustment. The above tilting and returning are also performed in the case of tilting the vehicle body 1 to the right.

In the vehicle body tilting device of the present embodiment, consequently, the pump tilting mechanism 40 serves to transfer compressed air back and forth between the left and right air springs 3L and 3R. This can reduce consumption of compressed air conventionally released to atmosphere. Thus, even when the tilting control of the vehicle body 1 is repeated in a rail section including successive curves, the consumption of compressed air can be greatly suppressed, which does not need to increase the sizes of the compressor not shown and the main tank 12 or provide two or more compressors and main tanks. Accordingly, the vehicle body tilting device of the present embodiment can reduce initial costs and maintenance costs. It is further possible to reduce the amount of compressed air to be generated by the compressor and improve an energy efficiency.

In the present embodiment, the above advantages can be achieved by generating pressure differences in the low-pressure-side tank 41 and the high-pressure-side tank 42 from the air springs 3L and 3R by the pump 34 for tilt operation. This pump tilting mechanism 40 can be provided with a simple structure and at low cost. The pump 34 has only to be driven as needed and thus more reduction of power consumption can be achieved.

Third Embodiment

Figure 7:
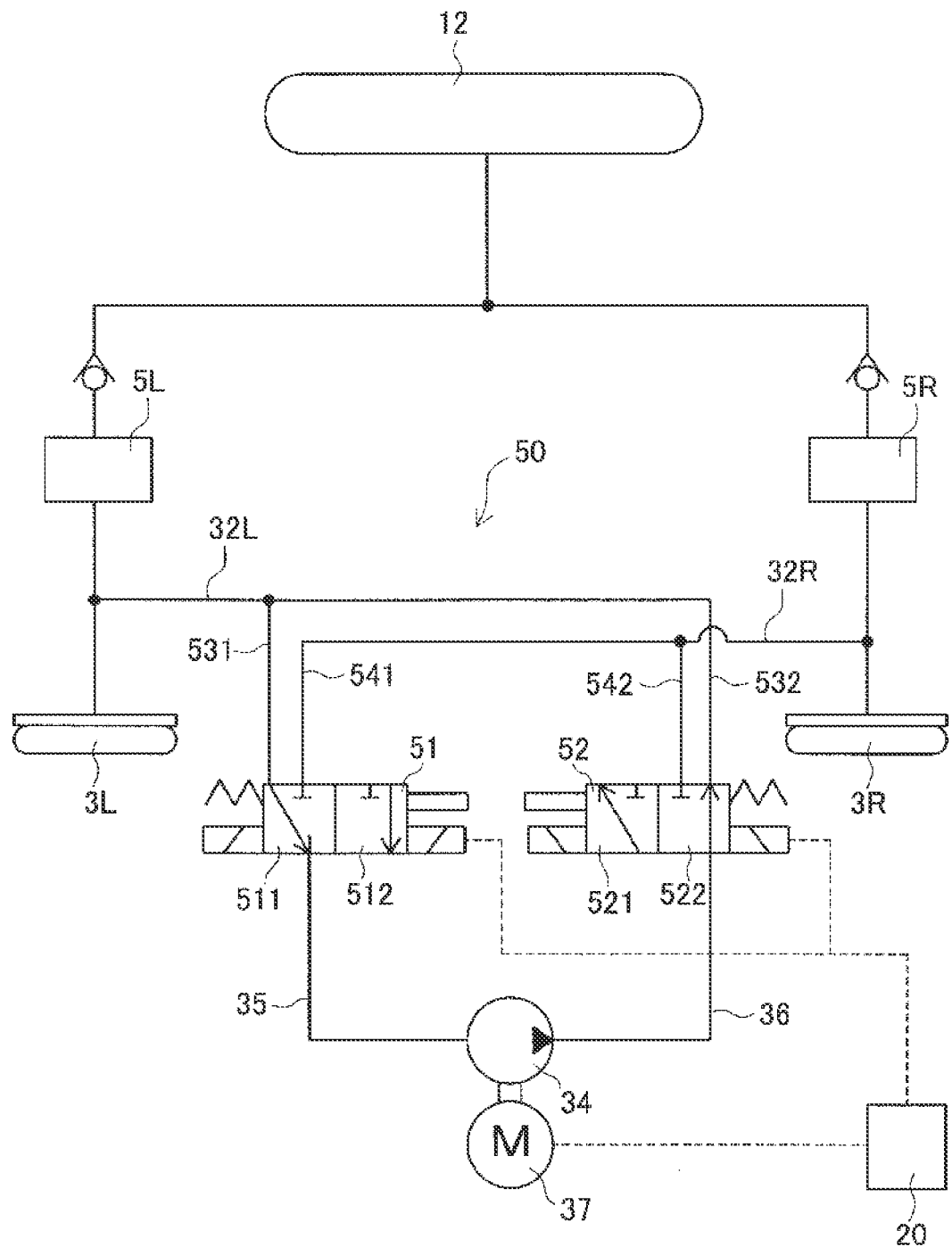
FIG. 7 is a conceptual diagram showing a pump tilting mechanism constituting a vehicle body tilting device in a third embodiment.

A third embodiment of a vehicle body tilting device for rail vehicle according to the invention will be described below. The third embodiment differs from the first embodiment in the pump tilting mechanism 30 shown in FIG. 5. FIG. 7 is a conceptual diagram showing a pump tilting mechanism of the present embodiment. Identical or similar parts to those in the first embodiment are given the same reference signs as those in the first embodiment. This pump tilting mechanism 50 is configured such that the upstream pipe 35 and the downstream pipe 36 are connected to the pump 34 for tilt operation, and a first control valve 51 for tilt operation and a second control valve 52 for tilt operation are connected to the pump 34. In the present embodiment, the first and second control valves 51 and 52 are low-cost three-port valves. The pipes 32L and 32R are branched respectively into pipes 531 and 532 and pipes 541 and 542. Those pipes are connected to the first and second control valves 51 and 52 as shown in the figure. The first and second control valves 51 and 52 and the pump motor 37 of the pump 34 are connected to the control unit 20.

When the vehicle body 1 is to be kept in a horizontal state, a first block 511 of the first control valve 51 is connected to the pipes 531 and 541 and a second block 522 of the second control valve 52 is connected to the pipes 532 and 542. The pump 34 is continuously or intermittently driven at so-called idle. By operation of the pump 34, the compressed air in the pipes is circulated through an circulation flow path so as to flow from the upstream pipe 35 to the downstream pipe 36, flow through the second control valve 52 into the pipe 532 and the pipe 531, and returns to the upstream pipe 35 through the first control valve 51. Accordingly, a delivery stand-by state is provided to thereafter transfer the compressed air between the air springs 3L and 3R.

When the vehicle body 1 is to be tilted to the left, for example, the second control valve 52 is switched to place the first block 521 in a connecting position. The left air spring 3L remains connected to the downstream pipe 35, while the right air spring 3R is connected to the upstream pipe 36 through the pipe 542. Accordingly, by operation of the pump 34, the compressed air in the air spring 3L is discharged therefrom and transferred into the opposite air spring 3R. The left air spring 3L lowers as the compressed air is discharged therefrom, while the right air spring 3R expands as the compressed air is supplied therein, thereby causing the vehicle body 1 to tilt to the left.

Just before the vehicle body 1 is tilted to a target angle, the second control valve 52 is switched to set the second block 522 in the connecting position. As in the first embodiment, the control is switched to tilting control by extension and retraction of the height adjusting cylinders 6L and 6R shown in FIG. 1. Specifically, the height control valves 5L and 5R are switched by extension and retraction of the height adjusting cylinders 6L and 6R to supply or discharge compressed air with respect to the air springs 3L and 3R to make fine adjustment of tilting of the vehicle body 1.

Thereafter, the vehicle body 1 is returned to the horizontal state when the rail vehicle exits the curved section of the traveling track. In this case, the first control valve 51 is switched to set the second block 512 in the connecting position. The left air spring 3L remains connected to the upstream pipe 36, while the right air spring 3R is connected to the downstream pipe 35 through the pipe 541. By operation of the pump 34, accordingly, the compressed air in the air spring 3R is discharged therefrom and transferred into the opposite air spring 3L. The expanded right air spring 3R lowers as the compressed air is discharged therefrom, while the contracted left air spring 3L expands as the compressed air is supplied therein, causing the vehicle body 1 to return to the horizontal state.

In this case, similarly, extension and retraction of the height adjusting cylinders 6L and 6R are controlled to supply or discharge the compressed air with respect to the air springs 3L and 3R through the height control valves 5L and 5R to make fine adjustment. The above tilting and returning are similarly performed in the case of tilting the vehicle body 1 to the right. That is, in the case of tilting the vehicle body 1 to the right, the reverse procedure to the above is conducted. Specifically, the first control valve 51 is first switched to set the second block 512 in the connecting position. When the vehicle body 1 is to be returned to the horizontal state, the second control valve 52 is switched to place the first block 521 in the connecting position.

In the vehicle body tilting device of the present embodiment, the pump tilting mechanism 50 serves to transfer compressed air back and forth between the left and right air springs 3L and 3R, so that the consumption of compressed air conventionally released to atmosphere can be reduced. Even when the tilting control of the vehicle body 1 is repeated in a rail section including successive curves, the amount of consumption of compressed air can be greatly reduced, which does not need to increase the sizes of a compressor not shown and the main tank 12 or to provide two or more compressors and main tanks. Furthermore, since the first and second control valves 51 and 52 are low-cost three-port valves, the vehicle body tilting device of the present embodiment can reduce initial costs and maintenance costs. It is further possible to reduce the amount of compressed air to be generated by a compressor and improve an energy efficiency.

In the present embodiment, the above advantages can be achieved by idling the pump 34 for tilt operation. Such pump tilting mechanism 50 can be provided with a simple structure and at low cost. The pump 34 has only to generate an internal pressure difference (on the order of 0 to 0.1 MPa) between the left and right air springs 3L and 3R. Thus, the pump 34 can be driven at less power. The pump 34 may be driven intermittently as needed, instead of driven continuously, so that further reduction of power consumption is achieved. Since the compressed air is actively delivered by the pump 34, the left and right air springs 3L and 3R can be expanded or contracted at high speed to increase the tilting speed and the returning speed.

Figure 8:
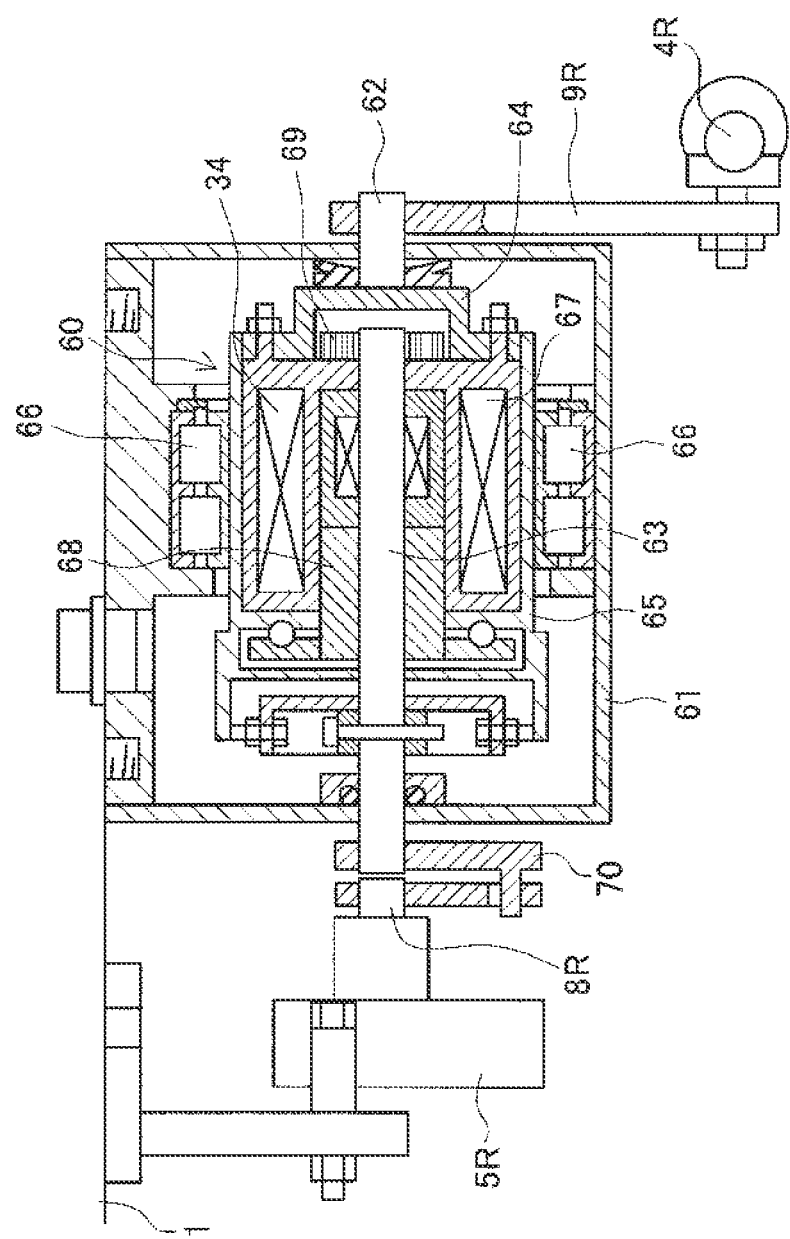
FIG. 8 is a cross sectional view showing a rotary solenoid constituting a height adjusting mechanism.
Figure 9:
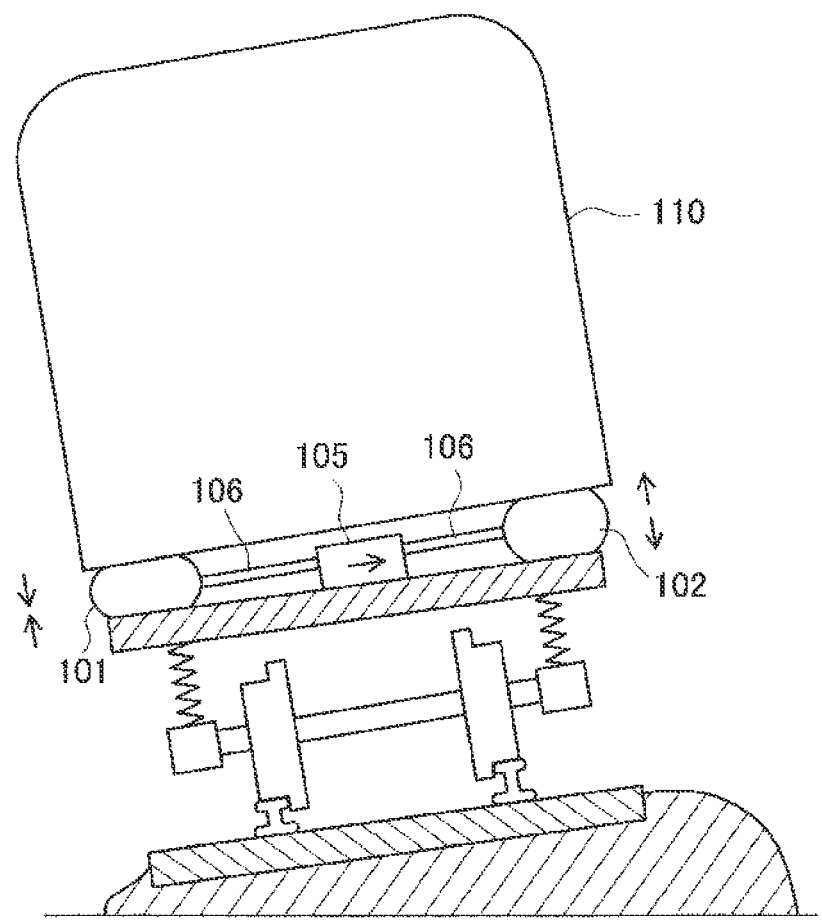
FIG. 9 is a cross sectional view of a rail vehicle provided with a conventional vehicle body tilting device.
Figure 10:
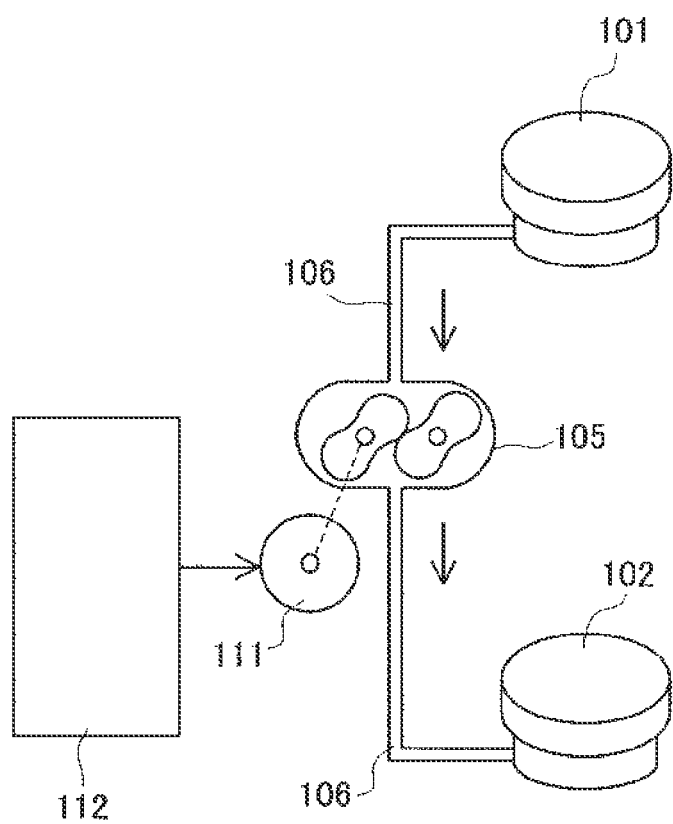
FIG. 10 is a conceptual diagram of a conventional vehicle body tilting controller.

Meanwhile, the vehicle body tilting device of the present embodiment is explained as including both the pump tilting mechanism and the height adjusting mechanism consisting of the height control valves 5L and 5R. The height adjusting mechanism is an auxiliary means to the pump tilting mechanism which is a major structure of the vehicle body tilting device. As another example, the following height adjusting mechanism may be adopted instead of the above one. FIG. 8 is a cross sectional view showing a part of such a height adjusting mechanism. This figure illustrates a right side configuration, but a left side configuration is similar. In the following description, identical or similar parts to those in the first embodiment are given the same reference signs as those in the first embodiment.

This height adjusting mechanism is configured such that the height adjusting rod 4R is directly connected to the lever 9R, eliminating the height adjusting cylinder 6R shown in FIG. 1, to constitute a link mechanism. On the other hand, a rotary solenoid 60 serving as an actuator is provided between the valve shaft 8R of the height control valve 5R and the lever 9R. Differently from the first embodiment in which the height control valve 5R is switched by extension and retraction of the height adjusting cylinder 6R, the switching of the control valve 5R in this example is performed by rotation of the rotary solenoid 60. As in the first embodiment, the valve shaft 8R is rotated by displacement of the height adjusting rod 4R in up and down directions, switching over the height control valve 5R.

The rotary solenoid 60 is provided in a body 61 fixed in the vehicle body 1. Shafts 62 and 63 arranged coaxial with each other protrude out from the body 61. On the shaft 62, fixed is a connecting member 64, which is connected to a cylindrical rotor 65 rotatably supported by a rolling bearing 66 in the body 61. The rotor 65 internally integrally includes a coil 67 in which the shaft 63 and an armature 68 are rotatably inserted. A return spring 69 is connected to the shaft 63 and placed between the shaft 63 and the rotor 65.

This return spring 69 transmits rotation of the shaft 62 to the other shaft 63. When the coil 67 is excited to rotate the shaft 63, the shaft 63 is allowed to rotate independently from shaft 62. The shaft 63 is connected to the valve shaft 8R of the height control valve 5R through a link lever 70. Accordingly, when the rotation of the shaft 62 is transmitted or the coil 67 is excited, rotating the shaft 63, the valve shaft 8R is rotated through the link lever 70 and thus the height control valve 5R is switched.

The height adjusting mechanism including the rotary solenoid 60 operates as below. When passengers board or exit the vehicle body 1, the vehicle body 1 is moved up and down in association with load variations thereof and the distance from the bogie 2 is changed. The height adjusting rods 4L and 4R (see FIG. 1) are relatively displaced in the up and down directions, thereby swinging the levers 9L and 9R, thus rotating the valve shafts 8L and 8R through the shafts 62 and 63. This switches the height control valves 5L and 5R to supply/discharge compressed air to/from the air springs 3L and 3R. When the levers 9L and 9R are returned to the horizontal position, the control valves 5L and 5R are switched again to stop supply/discharge of the compressed air.

For fine adjustment of tilting using the height adjusting mechanism explained in the first to third embodiments, the shaft 63 is rotated by the rotary solenoid 60, rotating the valve shafts 8L and 8R to switch the height control valves 5L and 5R. Thus, compressed air is supplied/discharged in/from the air springs 3L and 3R to adjust the tilting of the vehicle body 1.

The above embodiments explain the vehicle body tilting device and the vehicle body tinting method for rail vehicle according to the invention but they do not particularly give any limitations to the invention. The present invention may be embodied in other specific forms without departing from the essential characteristics thereof.

For instance, the above embodiments show the vehicle body tilting device including the pump tilting mechanism in combination with the height adjusting mechanism. As an alternative, the vehicle body tilting device may include only the pump tilting mechanism in the case of not requiring fine adjustment using the height adjusting mechanism.

The control valve 33 for tilt operation shown in FIG. 5 may be switched over to a proportional control valve to make fine tilting control at regulated flow rate.

Although the second embodiment uses the four-port electromagnetic valve as the control valve 43 for tilt operation, two three-port electromagnetic valves as shown in the third embodiment may be combined into a circuit. In the above embodiments, the control of fine adjustment using the height adjusting mechanism is performed after the control using the pump adjusting mechanism 30. Alternatively, both controls may be performed simultaneously.

Furthermore, one example of the actuator constituting the height adjusting mechanism is disclosed as the rotary solenoid, but the actuator may be selected from an electromagnetic rotary actuator such as a stepped motor and a servo motor, a rotary actuator that is pneumatically operated, and others.

The invention claimed is:

1. A vehicle body tilting device for rail vehicle, the device being configured to transfer compressed air between a pair of left and right air springs placed between a vehicle body and a bogie to expand and contract the left and right air springs to control tilting of the vehicle body, the device including:
   one or two control valves for tilt operation connected between the left and right air springs;
   a pump for tilt operation connected between the left and right air springs through the control valve or valves; and
   a control unit for controlling the control valve or valves and the pump,
   wherein the pump having an input port and an output port that are connected to an circulation flow path to allow compressed air to circulate therethrough from the outlet port to the inlet port,
   the one or two control valves is connected to a point in the circulation flow path, and
   wherein the control unit is configured to drive the pump in advance before controlling tilting of the vehicle body to circulate the compressed air through the circulation flow path to provide a delivery stand-by state, switch the control valve or valves at predetermined timing to transfer the compressed air from one to the other of the left and right air springs.

2. The vehicle body tilting device for rail vehicle according to claim 1, wherein the control unit drives the pump continuously or intermittently to provide the delivery stand-by state.

3. The vehicle body tilting device for rail vehicle according to claim 1, wherein the control valve is a single four-port electromagnetic valve configured to form a connecting pattern to transfer the compressed air from the left air spring to the right air spring, a connecting pattern to transfer compressed air from the right air spring to the left air spring, and a connecting pattern to shut off between the right and left air springs and constitute the circulation flow path.

4. The vehicle body tilting device for rail vehicle according to claim 1, wherein the control valves are two three-port electromagnetic valves configured to form a connecting pattern to transfer the compressed air from the left air spring to the right air spring, a connecting pattern to transfer compressed air from the right air spring to the left air spring, and a connecting pattern to shut off between the right and left air springs and constitute the circulation flow path.

5. The vehicle body tilting device for rail vehicle according to claim 1, further comprising:
a height adjusting mechanism including:
height control valves provided one in each of the pair of left and right air springs;
a link mechanism arranged to convert up-and-down displacement of a height adjusting rod connected to the bogie to rotation of a valve shaft of each height control valve; and
actuators placed in the link mechanism and configured to rotate the valve shafts,
wherein the control unit is configured to transfer compressed air from one to the other of the left and right air springs and drive the actuators at predetermined timing to supply and discharge compressed air with respect to the air springs through the height control valves.

6. The vehicle body tilting device for rail vehicle according to claim 5, wherein the actuators are air cylinders formed to be integral and coaxial with the height adjusting rods.

7. The vehicle body tilting device for rail vehicle according to claim 5, wherein the actuators are rotary solenoids arranged to rotate the valve shafts.

8. A vehicle body tilting method for rail vehicle, including adjusting tilting of a vehicle body by supplying and discharging compressed air to expand and contract a pair of left and right air springs placed between the vehicle body and a bogie, the method using:
one or two control valves for tilt operation connected between the left and right air springs;
a pump for tilt operation connected between the left and right air springs through the control valve or valves;
a vehicle body tilting mechanism including a low-pressure-side tank connected to an upstream pipe located between the control valve or valves and the pump and a high-pressure-side tank connected to a downstream pipe located between the control valve or valves and the pump; and
a height adjusting mechanism including height control valves provided one in each of the pair of left and right air springs, a link mechanism arranged to convert up-and-down displacement of a height adjusting rod connected to the bogie to rotation of a valve shaft of each height control valve, and actuators placed in the link mechanism and configured to rotate the valve shafts,
wherein the method includes:
driving the pump of the vehicle body tinting mechanism in advance before adjusting tilting of the vehicle body to generate a pressure difference between the low-pressure-side tank and the high-pressure-side tank to provide a delivery stand-by state, and switching the control valve or valves at predetermined timing to deliver compressed air from the high-pressure-side tank to one of the left and right air springs while drawing compressed air from the other air spring to the low-pressure-side tank, and
driving the actuator of the height adjusting mechanism at predetermined timing in association with tilting of the vehicle body to supply and discharge compressed air with respect to the left and right air springs via the height control valve or valves to make fine adjustment of the tilting.

9. The vehicle body tilting method for rail vehicle according to claim 8, wherein the pump is driven based on a detection value of a pressure sensor provided in the high-pressure-side tank.

* * * * *